US007665421B2

(12) United States Patent
Martz

(10) Patent No.: US 7,665,421 B2
(45) Date of Patent: Feb. 23, 2010

(54) DUAL ANIMAL CARRIER

(75) Inventor: Gayle Martz, New York, NY (US)

(73) Assignee: Gayle Martz, Inc., New York, NY (US)

( * ) Notice: Subject to any disclaimer, the term of this patent is extended or adjusted under 35 U.S.C. 154(b) by 282 days.

(21) Appl. No.: 11/524,551

(22) Filed: Sep. 20, 2006

(65) Prior Publication Data

US 2008/0066689 A1    Mar. 20, 2008

(51) Int. Cl.
*A01K 1/03* (2006.01)
(52) U.S. Cl. ........................................ 119/497; 190/108
(58) Field of Classification Search ................ 119/497, 119/496, 498, 499, 500, 482; 190/108, 109, 190/110, 111, 112
See application file for complete search history.

(56) References Cited

U.S. PATENT DOCUMENTS

| | | | | | |
|---|---|---|---|---|---|
| 2,610,472 | A | * | 9/1952 | Maxwell | 62/166 |
| RE25,826 | E | * | 8/1965 | Ward | 190/108 |
| 4,334,601 | A | * | 6/1982 | Davis | 224/148.3 |
| 4,693,344 | A | * | 9/1987 | Shuler | 190/107 |
| 4,995,436 | A | * | 2/1991 | Cantor | 150/102 |
| 5,005,679 | A | * | 4/1991 | Hjelle | 190/110 |
| 5,503,107 | A | * | 4/1996 | Satcher et al. | 119/496 |
| 5,526,907 | A | * | 6/1996 | Trawick et al. | 190/111 |
| D375,835 | S | * | 11/1996 | Christopher et al. | D3/289 |
| D398,082 | S | | 9/1998 | Martz | |
| D398,083 | S | | 9/1998 | Martz | |
| 5,941,195 | A | * | 8/1999 | Martz | 119/497 |
| 6,021,740 | A | | 2/2000 | Martz | |
| 6,155,206 | A | * | 12/2000 | Godshaw | 119/453 |
| 6,286,461 | B1 | | 9/2001 | Martz | |
| 6,382,377 | B2 | * | 5/2002 | Godshaw | 190/110 |
| 6,409,066 | B1 | * | 6/2002 | Schneider et al. | 224/585 |
| 6,508,358 | B2 | * | 1/2003 | Cheng | 206/315.1 |
| 6,619,447 | B1 | * | 9/2003 | Garcia et al. | 190/108 |
| 6,637,633 | B1 | * | 10/2003 | Eberle | 224/582 |
| D481,539 | S | | 11/2003 | Martz | |
| 6,821,019 | B2 | * | 11/2004 | Mogil | 383/110 |
| D548,408 | S | * | 8/2007 | Martz | D30/109 |
| 2002/0148741 | A1 | * | 10/2002 | Stobbs et al. | 206/112 |
| 2003/0127060 | A1 | * | 7/2003 | Yeung | 119/497 |
| 2004/0000458 | A1 | * | 1/2004 | Weiss et al. | 190/18 A |
| 2004/0108179 | A1 | * | 6/2004 | Scicluna et al. | 190/109 |
| 2004/0222059 | A1 | * | 11/2004 | Glankler | 190/108 |
| 2005/0224305 | A1 | * | 10/2005 | Davis | 190/113 |
| 2007/0137960 | A1 | * | 6/2007 | Redzisz | 190/111 |
| 2008/0128231 | A1 | * | 6/2008 | Newman | 190/108 |

* cited by examiner

*Primary Examiner*—Yvonne R. Abbott
(74) *Attorney, Agent, or Firm*—Abelman, Frayne & Schwab

(57) ABSTRACT

A soft-side portable animal carrier has an interior vertical partition wall to form separate compartments for transporting two small pets and each compartment has a releasable opening at the top and an end wall that can be opened completely to allow the animal easy egress. In an alternative configuration, each compartment has an interior partition wall and the carrier has a continuous zipper around its center to permit the compartments to be separated for individual use.

20 Claims, 7 Drawing Sheets

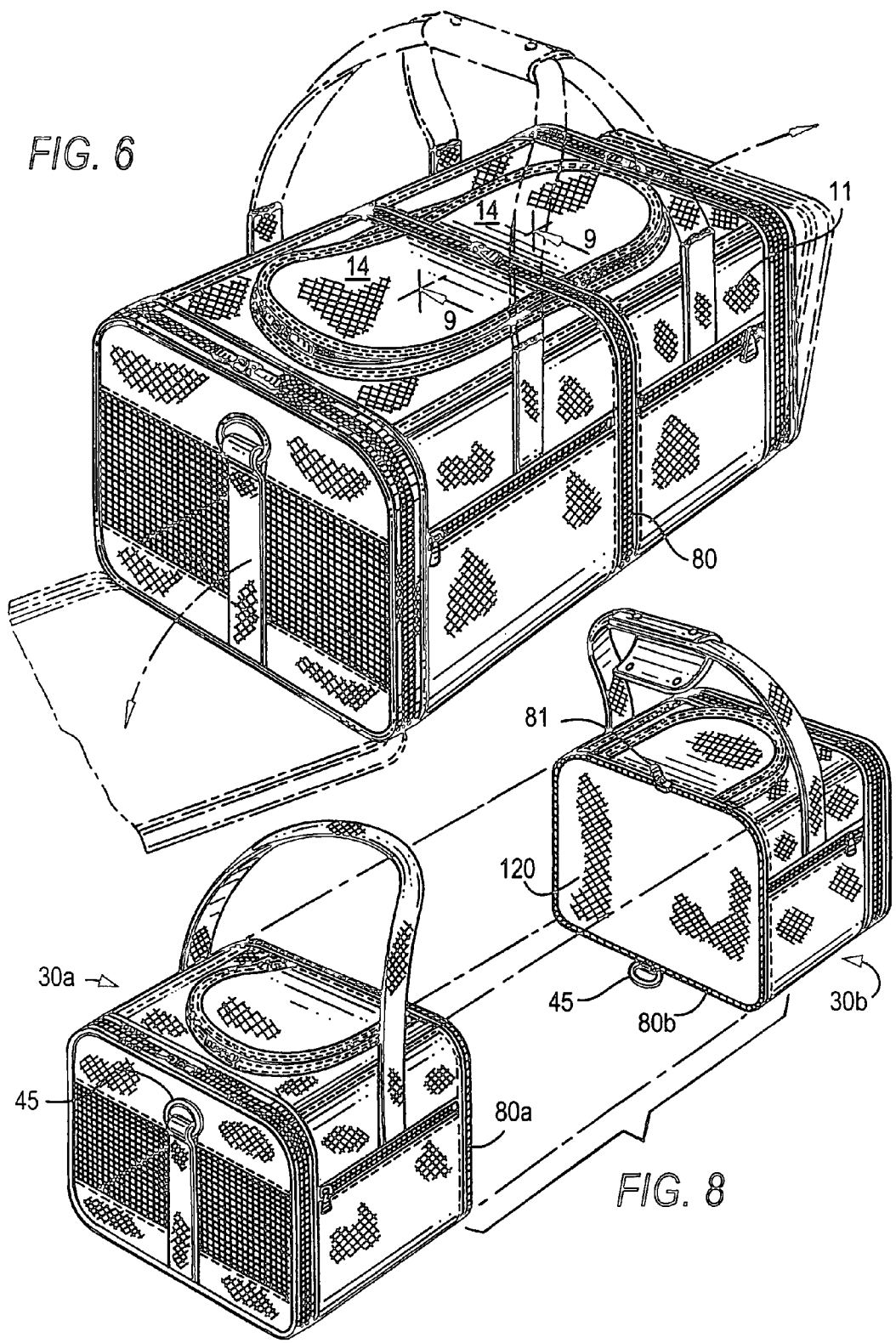

FIG. 7A
FIG. 7B
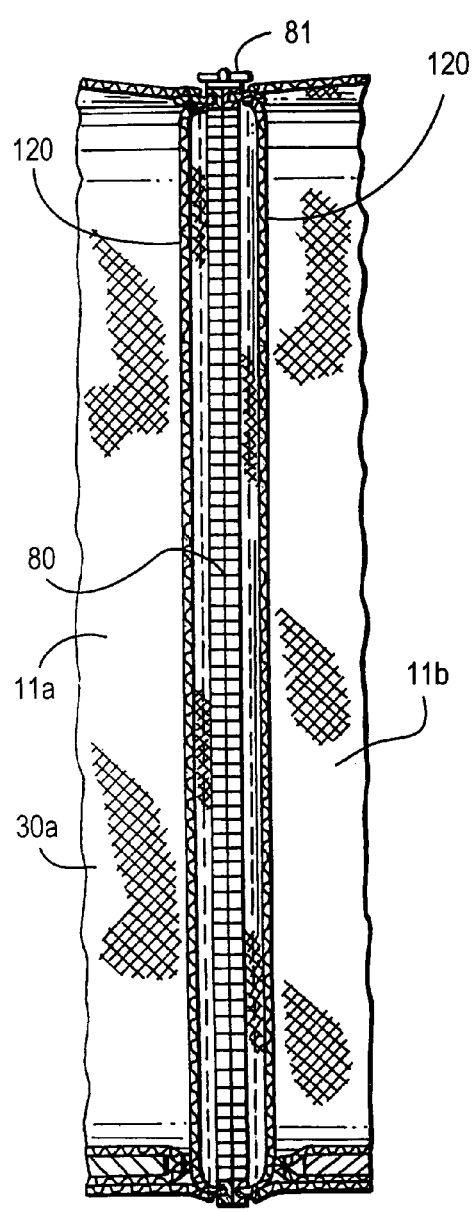
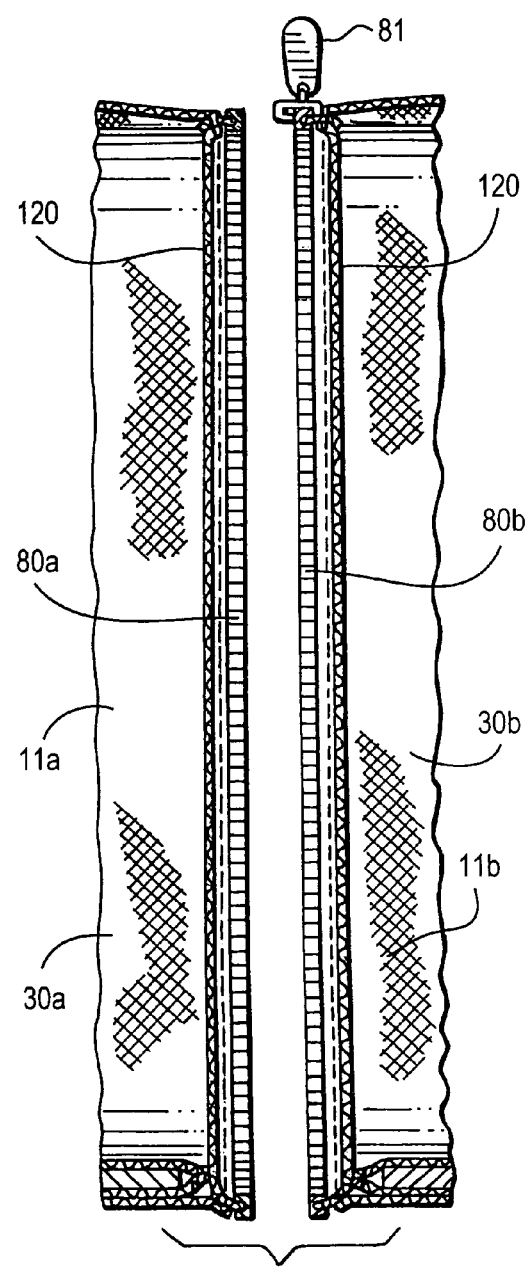

DUAL ANIMAL CARRIER

FIELD OF THE INVENTION

This invention relates to soft-sided portable carriers for transporting small animals, such as cats and dogs.

BACKGROUND OF THE INVENTION

A variety of pet carriers have been developed, including soft-sided portable enclosures having one or more mesh sidewalls, zippered openings for receiving and containing the animal and various strap and handle arrangements to facilitate transporting the carrier. Animal carriers of my design and construction are disclosed in U.S. Pat. Nos. 5,941,195, 6,021,740 and 6,286,461, the disclosures of which are incorporated herein by reference.

The prior art carriers have been designed and constructed for receiving a single pet. Since pet owners often have two animals, it would be desirable to have a carrier that is capable of transporting two small animals in a single structure that can be easily picked up and/or carried by means of a shoulder strap or straps.

It is therefore an object of this invention to provide a soft-sided portable animal carrier having at least two compartments for receiving small animals that is stable and lightweight.

It is another object of the invention to provide a dual pet carrier that can be lifted and supported by a handle or shoulder straps while maintaining the animals inside in a secure and stable condition.

Another object of the invention is to provide a portable pet carrier for more than one animal that can be stowed under a seat on an airplane and that otherwise meets prevailing standards for pet carriers that will be accepted in the passenger compartment of an airplane.

SUMMARY OF THE INVENTION

The above objects and other advantages are provided by a pet carrier that is constructed as an enclosure with a generally rectilinear configuration having at least one vertical central partition wall that forms two separate compartments, each of which compartments has at least one access panel that opens to receive or permit the pet to be placed in, or removed from the carrier, and one or more mesh sidewalls.

The interior dividing wall is preferably fabricated from a self-supporting material that is covered with a water-resistant fabric layer, but can be formed from the same mesh as the one or more exterior sidewalls and optionally, the top closure. In one preferred embodiment, the partition wall is secured at its lower portion to the bottom wall of the carrier and maintained in a vertical position by releasable fasteners, e.g., hook-and-loop fasteners secured to the top and sidewalls adjacent to the location of the vertical wall. The partition can be released to lie flat on the bottom for storage when the carrier is not in use.

In a particularly preferred embodiment, the top of each compartment is provided with a releasable closure and the end wall can be opened completely to permit easy egress of the animal. In another particularly preferred embodiment, one of the compartment sidewalls, e.g. the end wall, is also provided with a closure, conveniently, a zipper, that permits the animal to easily walk from the compartment when the end wall is open and the carrier is at rest on a floor or other supporting surface.

In another preferred embodiment, the carrier is fabricated, at least in part, from a nylon material, such as the type used for luggage. The end panel and top closures can be formed in whole or in part from a mesh material of the types well known in the prior art.

The carrier is also provided with fittings for the attachment of carrying handles and/or straps; alternatively, it can be provided with shoulder straps and handles that are permanently sewn to the carrier. The bottom of the carrier is preferably made rigid to provide a stable platform for the animal or animals in the compartments and can also be provided with four or more feet, or other supporting structure that serves to elevate the base from what may be a wet or unsanitary supporting surface in order to keep the exterior of the bottom wall clean and dry. The base of the carrier can also be provided with wheels and a towing strap or handle to relieve the user from carrying the animals through airports and in hotels, and the like.

One or more of the surfaces comprising the top, bottom and/or sidewalls can be a quilted fabric to provide additional padding and comfort for the pet and also an aesthetically appeal. Support for the structure can be provided by a lightweight plastic or wire framework, or by piping sewn into the margins that serves both a decorative and functional purpose.

The access panels are preferably opened by zippers extending around three sides. The access panels can also be closed by hook-and-loop fasteners, such as those sold under the VELCRO® trademark.

The carrier can also be provided with external pockets and/or pouches, either open or closed for receiving pet accessories, food packets, water bottles, collapsible food and water feeding containers, and the like. The pockets can be formed of elastic mesh and can be provided with fasteners for added security.

The soft-sided carrier can be compressed for shipping and storage. Handles and shoulder straps can be detached for convenience when the carrier is stowed at the passenger's feet on board the plane to eliminate a trip hazard. Removable straps also are conveniently stored inside of the carrier when it is not in use and is compressed or collapsed for storage.

In another preferred embodiment, the carrier is constructed with a pair of separate vertical partition walls that form the individual animal compartments and a zipper is provided that extends around the entire central exterior portion to permit separation and joining of the two individual carrier compartments. This arrangement is particularly convenient for those occasions when one of the animals is removed, e.g., at a veterinarian's office and remains behind when the owner leaves with the second pet. By unzipping the empty compartment, the remaining compartment with the pet can be more easily transported and the empty portion folded or otherwise stowed in a carrying case. As will be apparent to one of ordinary skill in the art, alternative means of joining the two separate compartments along the abutting walls include fabric strips with snap fasteners, sections of hook-and-loop fasteners which extend from one of the compartments to the other across the adjacent sidewalls, and the like.

In this embodiment, each side of the separable carrier sections is provided with a handle that can be moved to a central position over the dividing walls of the dual carrier and gripped by the user in one hand. Similarly, portions of shoulder straps can be joined to each of the single compartments and arranged so that they can be gathered together for transporting the carrier with two pets on board. An additional pair of supporting feet can also be provided adjacent the central portion in order to stably support each of the compartments when they are separated.

The bottom can be further stabilized and made more rigid by including a sliding rigid panel that extends across the gap between the compartments when the two are joined. In practice, the use of a continuous zipper to join the two compartments provides sufficient rigidity to provide a stable platform for the pets being transported.

Other optional features include one or more panels that are sewn or otherwise held in position to permit the user to position a separate protective fabric panel over the mesh portions of the carrier walls. This feature may be desirable if the pets are being transported in a cold or wet climate, or if it is desired to isolate the animal from disturbing distractions. The closing panels can be quilted or otherwise insulated to increase their protective capability for the animals being transported. When not in use, these closure flaps can be positioned on the bottom of the respective compartments. As it will be apparent, these panels will not be airtight and the animals will at all times be provided with a sufficient airflow to support normal respiration.

BRIEF DESCRIPTION OF THE DRAWINGS

The pet carrier of the invention will be described in further detail below and with reference to the attached drawings in which:

FIG. 6 is a perspective view of a second embodiment of the carrier which includes an encircling central zipper;

FIGS. 7A and 7B are detailed views of the carrier of FIG. 6 showing the central zipper in the closed and open positions; and FIG. 8 is a view of the carrier of FIG. 6 showing the compartments separated following opening of the zipper.

DETAILED DESCRIPTION OF THE INVENTION

The invention will be further described with reference to the embodiment illustrated in FIGS. 1-5.

Figure 1:
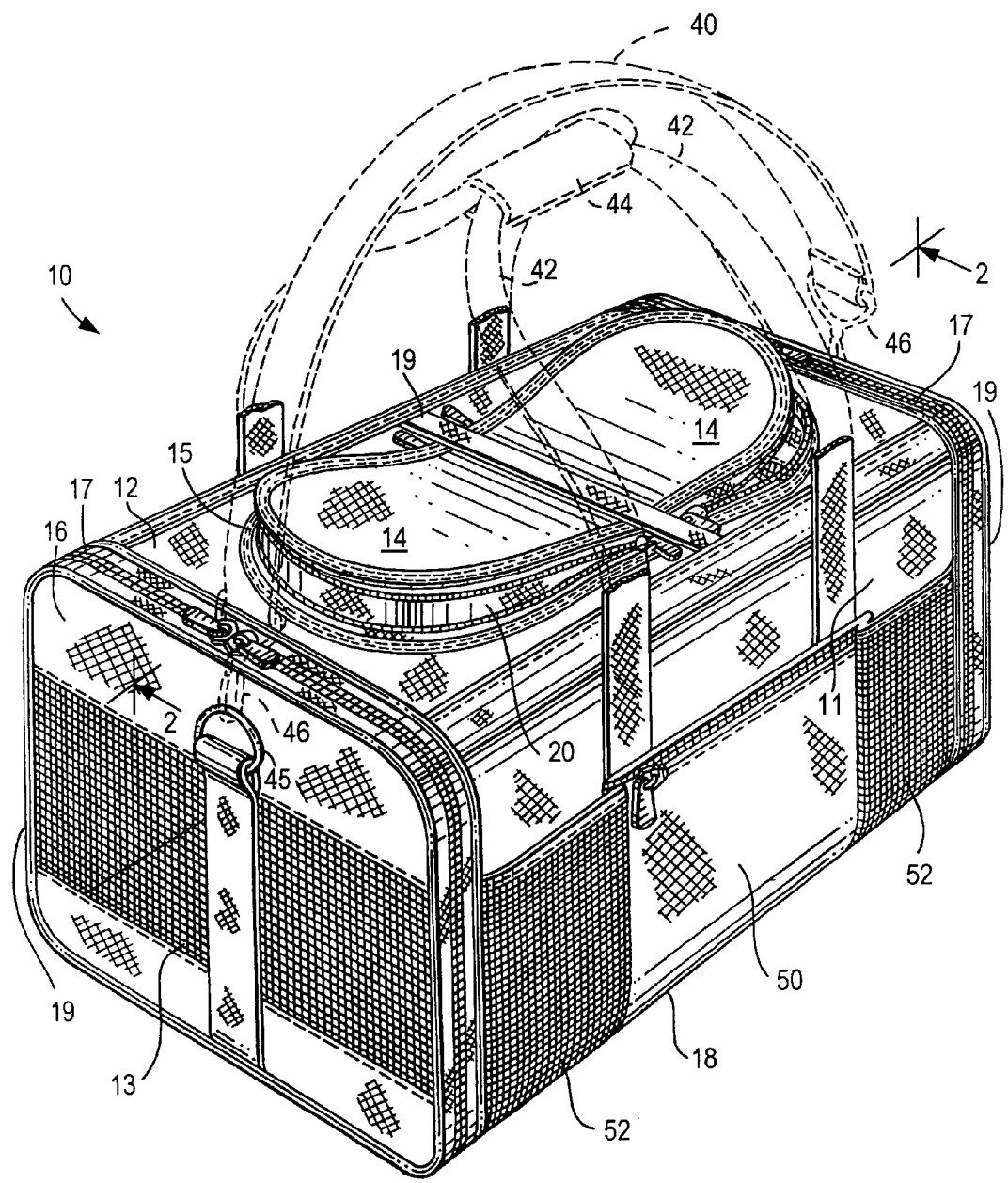
FIG. 1 is a front, top and side perspective view of one embodiment of the dual animal carrier of the invention.

Referring now to FIG. 1, the carrier 10 is formed in the embodiment shown as a rectilinear enclosure having opposing end walls 16 hingedly attached to bottom wall 18 and joined to side walls 11 and top wall 12 by fasteners 17, which in this embodiment are zippers. Top wall 12 is provided with closures 14 opened by zippers 15 and hinged at the central portion 19. A centrally positioned, vertical partition wall 20, best shown in FIG. 2, forms two separate compartments 30. With the end wall 16 closed, closure 14 can be easily opened to permit the animal to lift its head out of the compartment, while the rest of its body remains in the compartment.

Exterior compartments are provided to include travel accessories, such as veterinary papers, snacks, water bottles, collapsible water/food bowls, and small toys for the animals. The exterior compartments are shown as compartment 50 along the front wall which may be accessed by a zipper and compartments 52 which may be an elastic mess material size to accommodate water bottles.

Referring again to FIG. 2, the bottom 18 of the carrier includes a separate reinforced panel 32 which preferably includes a smooth vinyl outer layer 34 for ease of cleansing. One side is preferably pivoted at its interior end 36 to further facilitate cleaning by providing access to the undersurface. For additional animal comfort, a soft washable and removable liner (not shown) can be provided. Protective supporting elements 66 are located in proximity to the corners of bottom wall 18, can be formed of plastic and can be secured to the bottom wall by appropriate fasteners or adhesively bonded.

Figure 2:
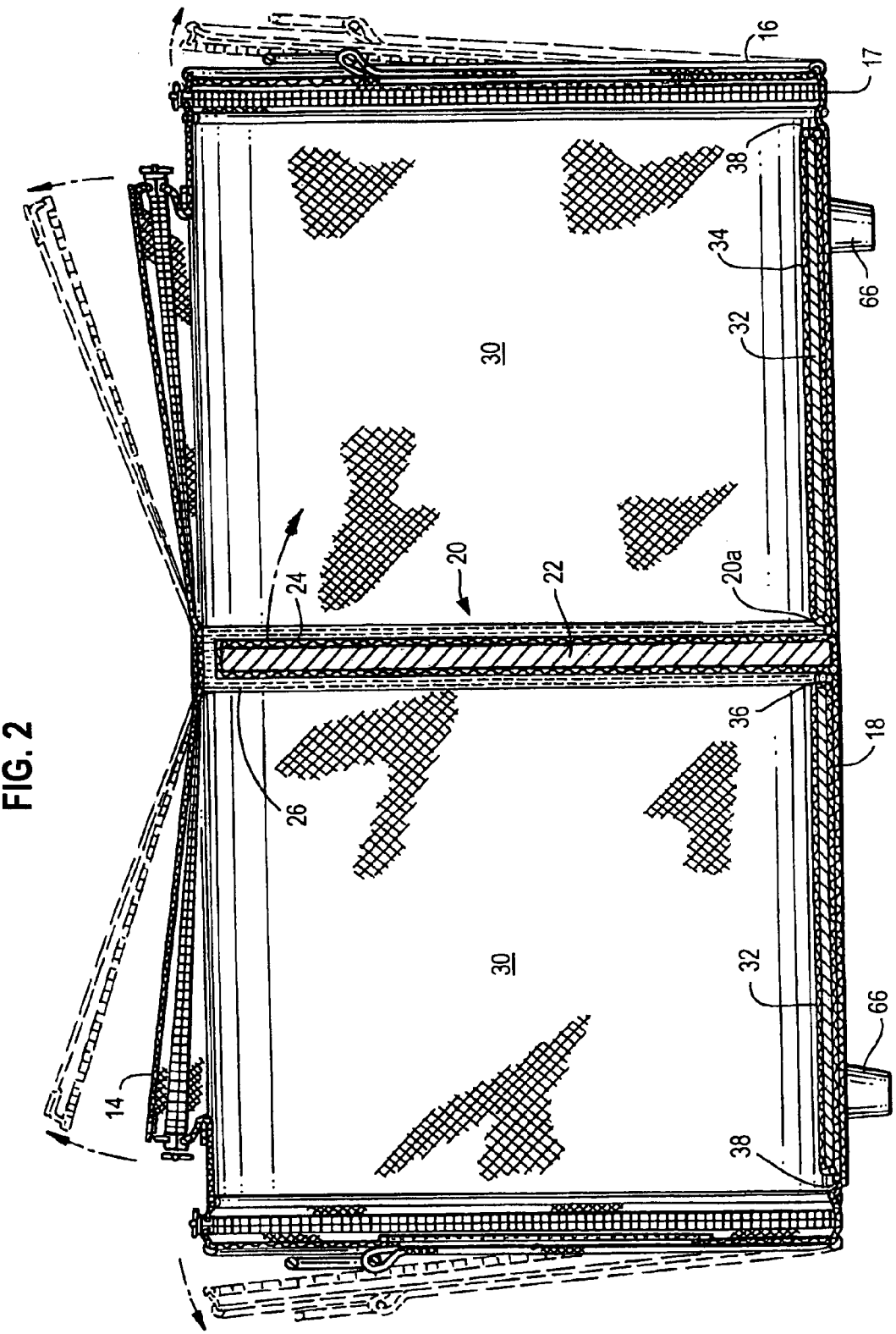
FIG. 2 is a front elevation sectional view of the carrier along section 2-2 of FIG. 1 showing the partition wall between the compartments at either end.
Figure 3:
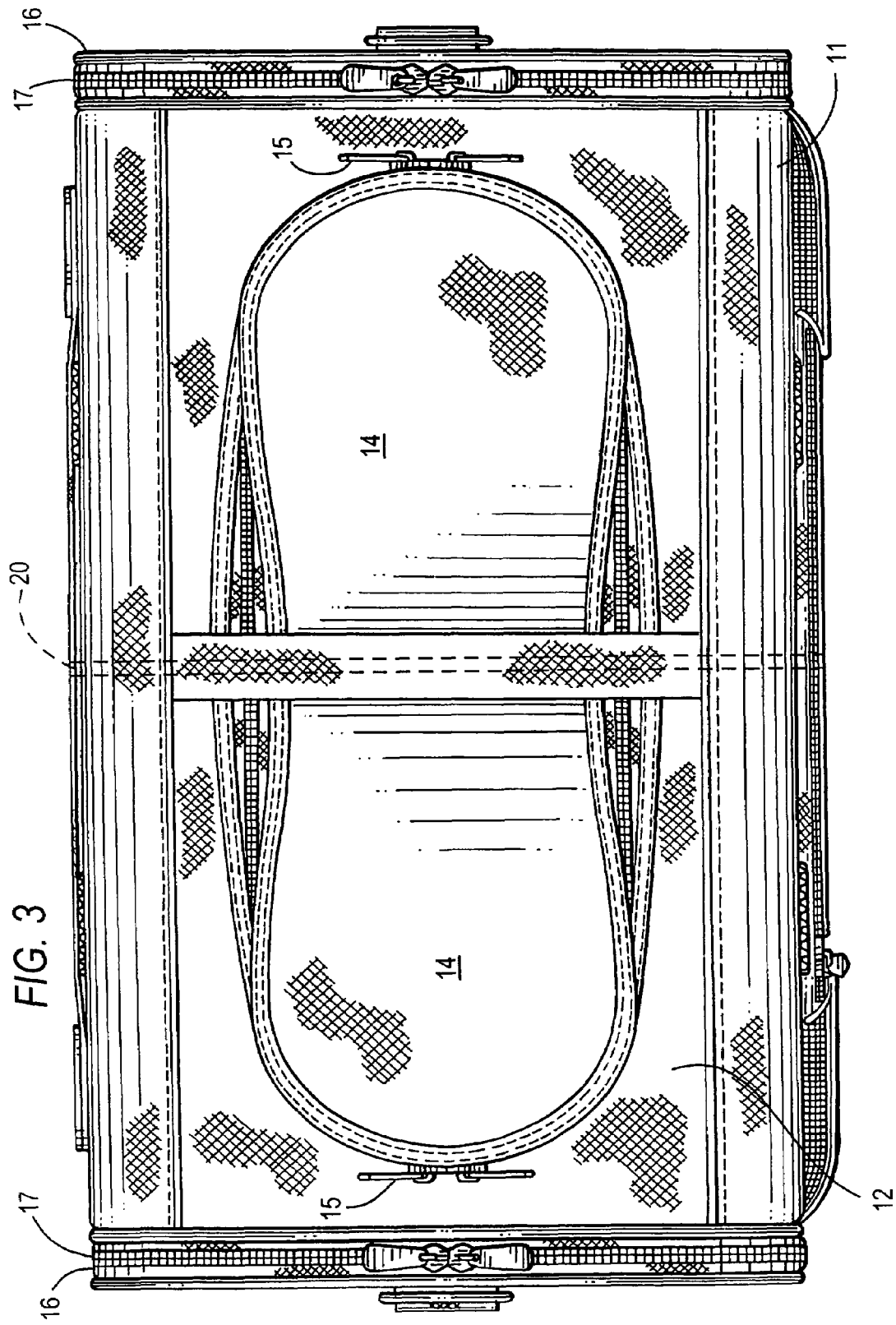
FIG. 3 is a top view of the carrier showing the two separate closures for the adjacent interior compartments.

With reference to the cross-sectional view of FIG. 2, centrally positioned dividing wall 20 is preferably formed with an internal reinforcing member 22 that is covered with a protective fabric layer 24 which can be a smooth or quilted vinyl material. In a particularly preferred embodiment, the partition wall 20 is stitched or otherwise permanently secured to the bottom wall of the carrier at 20a. The partition wall 20 and the interior surface of the carrier around its central portion is provided with releasable fasteners, such as lengths of hook-and-loop fasteners, e.g., those sold under the VELCRO® trademark, so that the partition wall 20 can be held securely in place during use, and folded flat into one or the other adjacent compartments for storage in order to permit the carrier to be collapsed when not in use.

To provide for further reinforcement of the portable animal carrier, and to maintain the condition shown in FIG. 1, a rectangular rigidizing frame or beading 19, which may typically be formed of extruded plastic or of plastic-covered wire, is provided about the perimeter of the end walls 16. The rigid frame is preferably pivoted with respect to the bottom wall 18 about its corner junctions 38. This permits the end wall 16 to be moved to a position over the bottom wall 18 during storage.

As previously noted, the walls define a generally rectilinear interior volume, which is of a suitable size to be divided into two separate compartments each of which can accommodate a small animal for transport, such as a cat or small dog, and can be comfortably retained below an airline seat. Typically, the portable animal carrier can be between 18 to 20 inches long, 10 to 12 inches high, and 11 to 12 inches wide. It is constructed of materials utilized for luggage, such as woven and quilted nylon, vinyl, other reinforced textile fabrics, and/or leather.

At least one, and preferably more than one, of the walls includes an area formed of mesh material for providing ventilation to the interior of the enclosure. Such mesh material portions are shown as 13 in the end wall 16 and in the rear wall. To facilitate manual carrying of the portable animal carrier, straps, such as 42 are connected to the front and rear walls, extend over the top wall 12, and can be joined together by a handle 44. Shoulder strap 40 can be removably connected by clips 46 to ring connectors 45, at the opposite ends 16, to provide an additional carrying strap in the well known manner. When strap 40 is removed it can also serve as a leash using clip 46 to attach to the loop (not shown) of a conventional animal collar.

A plurality of support members 66 are attached to the underside of the bottom 18 of the carrier in order to keep it dry and relatively clean when the carrier is placed on a sidewalk or other outdoor area. As disclosed in U.S. Pat. No. 6,021,740, the carrier can also be provided with supporting wheels that will facilitate movement of the carrier over relatively smoother surfaces typically found in airports and hotels. One end of the shoulder strap 40 can be released to facilitate towing the wheeled carrier.

Figure 4:
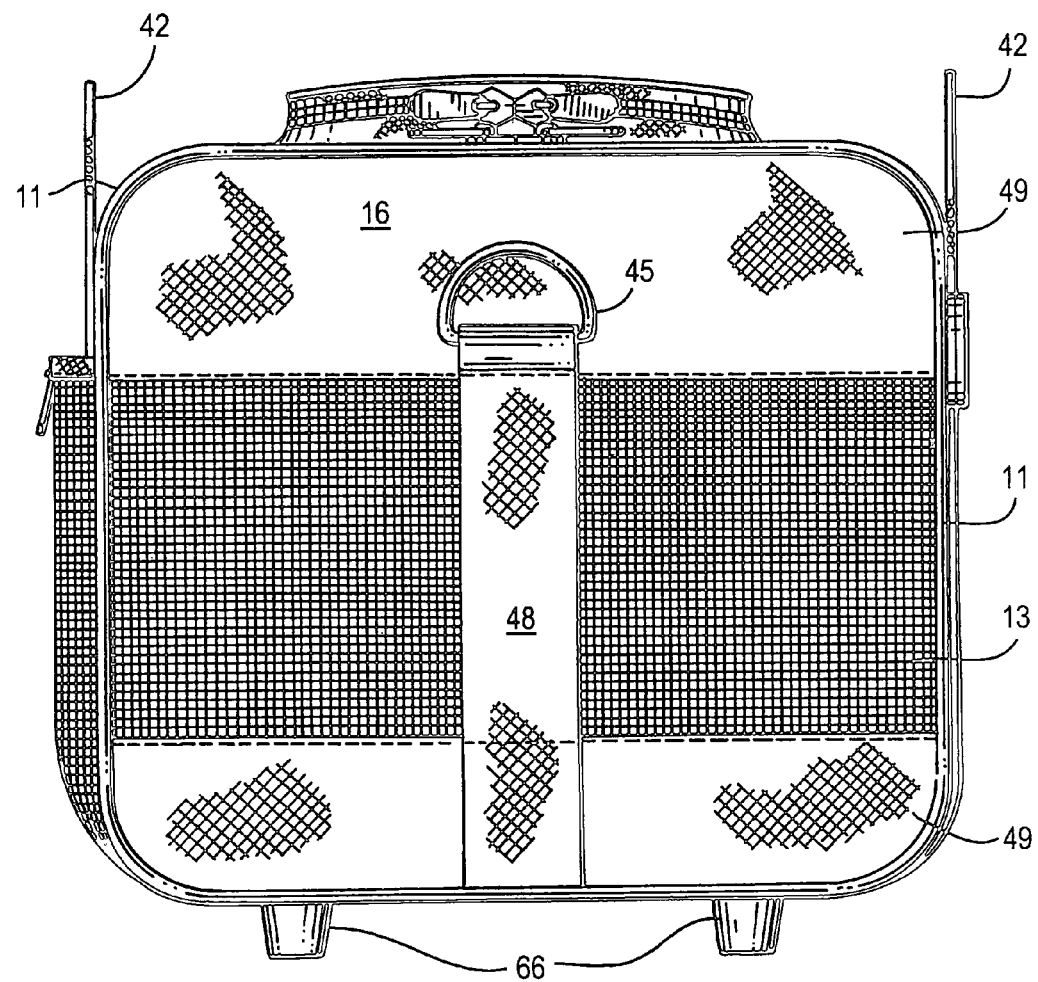
FIG. 4 is an end view showing a zippered closure or door that permits easy egress for an animal from the compartment.
Figure 5:
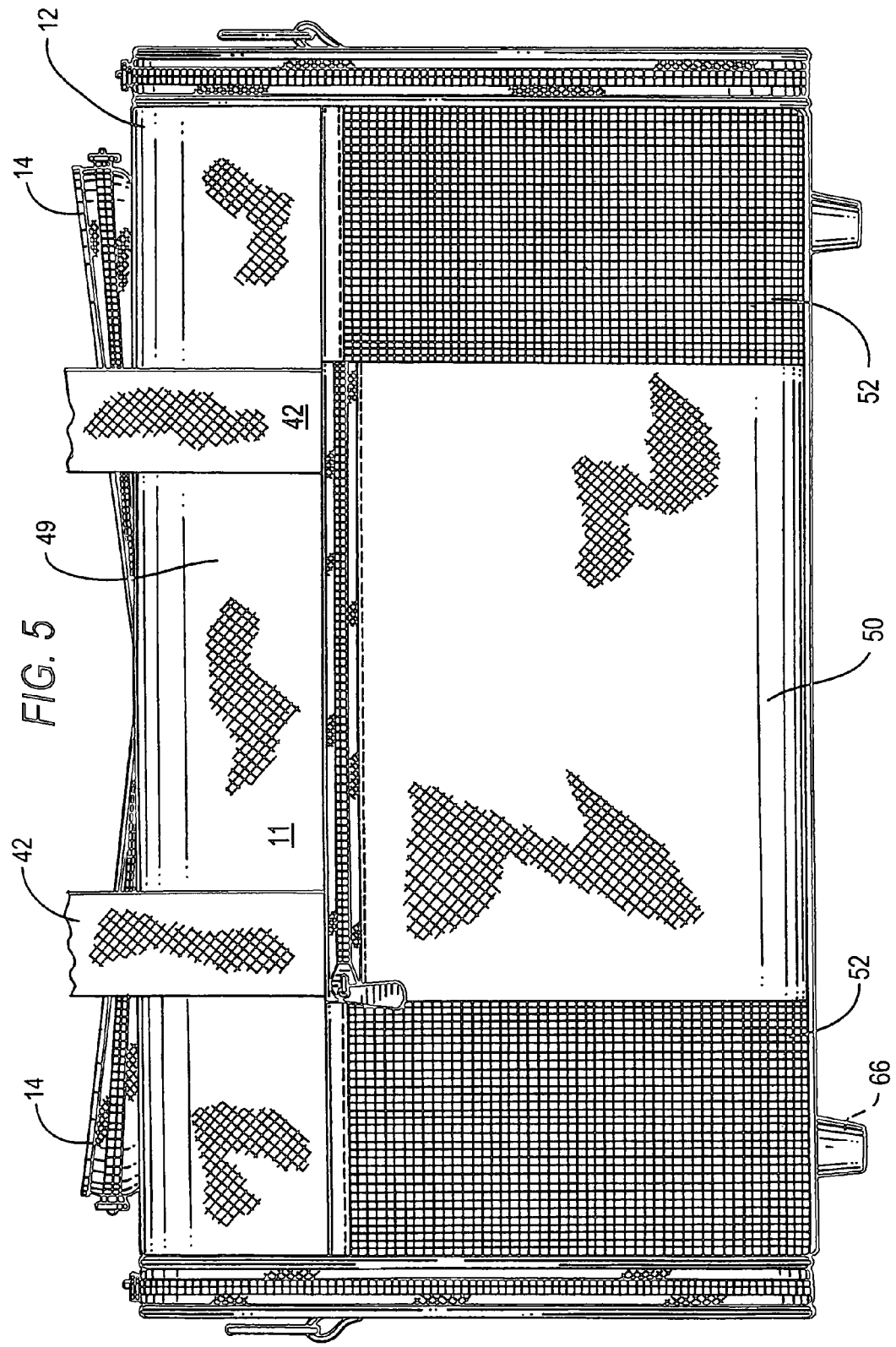
FIG. 5 is a front elevational view of the carrier.

As will be apparent from the end view of FIG. 4 and front view of FIG. 5, when opened, end wall 16 permits an animal to easily walk from the compartment on the inside surface of the wall. Reinforcing elements, such as strip 48 and panels 49 can be provided to add strength and rigidity to the carrier, both when it is resting on supports 66 and also when it is being carried by strap handles 42 or shoulder strap attachment rungs 45.

As shown in a second preferred embodiment illustrated in FIGS. 6-9, the carrier is provided with a continuous zipper 80 that is centrally positioned and extends around the top, bottom, front and rear walls. When the zipper pull 81 is drawn around the vertical circumference of the carrier, each compartment 30 can be separately transported, i.e., as best shown in FIG. 8.

As shown in the enlarged view of FIGS. 7A and 7B, each compartment 30*a* and 30*b* is provided with a separate partition wall 120 that is positioned adjacent the zipper elements 80*a* and 80*b* towards the interior of the respective compartments. Thus, in this embodiment, the carrier is provided with a pair of interior vertical partition walls 120 that are spaced apart from each other along the periphery of the respective zipper elements. When the compartments 30 are separated, as illustrated in FIG. 8, additional support for manual carrying can be provided by a shoulder strap 40 (as shown in FIG. 1) having clips 46 that are attached to the rings 45 that are located on the end panels 16 and adjacent the bottom 18.

As will be apparent to one of ordinary skill in the art from the above disclosure, a carrier having additional compartments, e.g., three or even more, can be provided. For example, a third compartment can be centrally positioned between the two described above and illustrated in the drawings. Easy egress for the animal can be provided by a zippered side wall opening, hinged to the bottom wall as otherwise described above. A group of four compartments can be formed by joining two of the carriers described in detail above along a common sidewall.

In this regard, it will be understood that the size or scale of the carrier and the compartments will be determined by the size of the animals to be transported. The overall size can be smaller where pets such as gerbils, hamsters or guinea pigs are to be carried. Pairs of carriers can be assembled by means of snaps, hook-and-loop fasteners, and the like, with appropriate fittings, such as rings for receiving snaps attached to handles and shoulder straps.

As will be apparent from this disclosure and the prior art, the method and materials of construction, manual carrying handles and straps, and accessories that can be included with the multiple animal carrier of this invention can be varied. The scope of the invention is therefore to be determined by the claims that follow.

I claim:

1. A soft-sided portable animal carrier comprising an enclosure having two opposing end walls, each end opening into the interior of the enclosure, opposing side walls extending between the ends, a top wall and a rigid bottom wall joined to the end and side walls, at least one centrally positioned vertical partition wall dividing the enclosure into two separate compartments wherein the at least one partition wall is fabricated from a self-supporting composite material, the top wall above each of the separate compartments having resealable closures of a sufficient size to freely admit the passage of a small animal into and out of the separate compartment.

2. The carrier of claim 1 in which the end walls are closed by a zipper extending along both sides and the top.

3. The carrier of claim 1 in which each of the end walls is hinged to the bottom wall, whereby an animal can walk out of the compartment when the end wall is in the fully opened position.

4. The carrier of claim 1 in which each of the resealable closures in the top are generally rectangular and are closed by a zipper extending around three sides of the closure.

5. The carrier of claim 4 in which each of the top closures is hinged for opening along a central portion of the top.

6. The carrier of claim 1 in which the partition wall is releasably secured in the vertical position.

7. The carrier of claim 6 which includes hook-and-loop fasteners for releasably securing the partition wall in position.

8. The carrier of claim 6 in which the lower portion of the partition wall is secured to the bottom wall of the carrier, whereby the partition wall can be moved to a position that is generally parallel to the bottom wall.

9. The carrier of claim 1 in which the composite material is covered with a protective water-resistant material.

10. The carrier of claim 1 which has two centrally positioned partition walls each defining the interior wall of a compartment and releasable joining means extending around the central vertical circumference of the carrier and positioned between the peripheries of the respective interior vertical partition walls, whereby two separate carrying compartments are provided upon release of the joining means.

11. The carrier of claim 10 in which the joining means is a continuous zipper.

12. The carrier of claim 10 in which the joining means are sections of hook-and-loop fasteners.

13. The carrier of claim 10 in which each of the interior walls is formed from a self-supporting material.

14. The carrier of claim 10 which further includes at least one carrying means joined to the exterior surface of each compartment, whereby a separated compartment can be manually transported.

15. The carrier of claim 10 which includes attachment means for releasably securing a second carrying means to each of the compartments when the compartments are separated.

16. The carrier of claim 10 which includes a plurality of supporting elements extending from the exterior of the bottom wall of each compartment to stably support the compartment on a horizontal surface.

17. A soft-sided portable animal carrier comprising an enclosure having two opposing end walls, each end opening into the interior of the enclosure, opposing side walls extending between the ends, a top wall and a rigid bottom wall joined to the end and side walls, two centrally positioned interior vertical partition walls dividing the enclosure into two separate compartments, the top wall above each of the separate compartments having resealable closures of a sufficient size to freely admit the passage of a small animal into and out of the separate compartment, and releasable joining means extending around the central vertical circumference of the carrier and positioned between the peripheries of the respective interior vertical partition walls, whereby two separate carrying compartments are provided upon release of the joining means.

18. The carrier of claim 17 in which the joining means is a continuous zipper.

19. The carrier of claim 17 in which the joining means are sections of hook-and-loop fasteners.

20. The carrier of claim 17 which further includes at least one carrying means joined to the exterior surface of each compartment, whereby a separated compartment can be manually transported.

* * * * *

UNITED STATES PATENT AND TRADEMARK OFFICE
CERTIFICATE OF CORRECTION

PATENT NO. : 7,665,421 B2  Page 1 of 1
APPLICATION NO. : 11/524551
DATED : February 23, 2010
INVENTOR(S) : Gayle Martz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 438 days.

Signed and Sealed this

Twenty-eighth Day of December, 2010

David J. Kappos
*Director of the United States Patent and Trademark Office*